United States Patent [19]

Bald

[11] Patent Number: 4,852,440

[45] Date of Patent: Aug. 1, 1989

[54] FLYING SHEAR OR STAMPING APPARATUS FOR STRIP MATERIAL

[76] Inventor: Eberhard Bald, Waldstrasse 14, D-5927 Erndtebruck 2, Fed. Rep. of Germany

[21] Appl. No.: 117,147

[22] Filed: Nov. 5, 1987

[30] Foreign Application Priority Data

Nov. 5, 1986 [DE] Fed. Rep. of Germany ....... 3637625

[51] Int. Cl.4 .......................... B23D 25/06; B26D 1/58
[52] U.S. Cl. ...................................... 83/317; 83/298; 83/295
[58] Field of Search .................. 83/317, 316, 295, 298, 83/311, 285

[56] References Cited

U.S. PATENT DOCUMENTS

| | | | |
|---|---|---|---|
| 3,156,150 | 11/1964 | Sarka | 83/317 X |
| 3,518,910 | 7/1970 | Munchbach | 83/316 |
| 3,906,827 | 9/1975 | Fritz | 83/316 X |
| 3,946,630 | 3/1976 | Roehrig et al. | 83/316 X |
| 4,319,505 | 3/1982 | Otake et al. | 83/316 |
| 4,621,554 | 11/1986 | Poloni | 83/317 |

FOREIGN PATENT DOCUMENTS

| | | |
|---|---|---|
| 223910 | 10/1962 | Austria . |
| 2225933 | 2/1973 | Fed. Rep. of Germany . |
| 2320509 | 4/1975 | Fed. Rep. of Germany . |
| 85256 | 10/1971 | German Democratic Rep. . |
| 857861 | 1/1961 | United Kingdom . |

OTHER PUBLICATIONS

Patent Abstracts of Japan, M-71, Sep. 5, 1979, vol. 3, No. 105.

*Primary Examiner*—Donald R. Schran
*Attorney, Agent, or Firm*—Young & Thompson

[57] ABSTRACT

An apparatus is of such a structure that it is possible to cut with flying shears, at great cutting accuracy, varying lengths under program control, this apparatus being of a compact construction and operating without mechanical intermediate members to be engaged and disengaged or to be exchanged as is the case with conventional pendulum shears. For this purpose, an eccentric (5) is provided for the oscillating drive of an oscillating yoke (2), as well as for carrying out the cutting stroke on both sides of the yoke (2). This eccentric is coupled with a top cutter bar (4) guided in the oscillating yoke (2) to be movable upwards and downwards, and is driven by controlled drive mechanisms (10) by way of associated gear systems in correspondence with the strip speed and the length of the strip material (6) to be cut off. In place of the oscillating yoke, it is also possible to provide top and bottom eccentrics driven in synchronism in opposite directions by way of controlled drive mechanisms, these eccentrics, during the cutting operation, moving the top and bottom cutter or tool bars by way of slotted guides toward each other to perform the cutting stroke as well as in the direction of movement and with the speed of the strip material. The apparatus serves for the continuous cutting to length of strip material fed from the coil.

3 Claims, 6 Drawing Sheets

2

FLYING SHEAR OR STAMPING APPARATUS FOR STRIP MATERIAL

BACKGROUND OF THE INVENTION

The invention relates to an apparatus for subjecting strip material to cutting by flying shears or to stamping.

BRIEF DESCRIPTION OF THE PRIOR ART

In conventional pendulum shears, control is effected by way of clutches and gear drive mechanisms. When converting to different lengths of strip to be cut off, it is thus necessary in the conventional pendulum shears to exchange gear wheels or perform appropriate shifting steps. In this arrangement, there is a basic length that can be doubled by leaving out a cutting stroke. In between several other lengths can be cut by speed-change gear operation. It is impossible herein to continuously cut differing strip lengths in accordance with a specific program.

SUMMARY OF THE INVENTION

The invention is based on the object of designing an apparatus of the aforementioned type so that it is possible to cut with flying shears, at great cutting accuracy, varying lengths under program control, using a compact structure and making do without mechanical intermediate members to be engaged and disengaged or to be exchanged.

In the apparatus of this invention, an accurate, program-controlled cross cutting (cutting to length) of strip material is made possible, synchronous with the strip speed, and with the cutting site being regulated by way of the controlled speed of the eccentric or of the eccentrics; in other words, at the instant of cutting, the shear exhibits strip speed and targets the exact cutting point. If the blades of the shear are not in the strip, the eccentrics can be driven faster or more slowly in order to cut off differing lengths. In case of particularly large lengths, the eccentrics can be stopped in top dead center, then be set into motion again at the right instant. In place of the top and bottom blades, it is also readily possible to utilize stamping tools, for example, for punching holes into the strip material or to execute shaping cuts.

BRIEF DESCRIPTION OF THE FIGURES

A preferred embodiment of the invention is illustrated in the drawings wherein.

DETAILED DESCRIPTION

Figure 1:
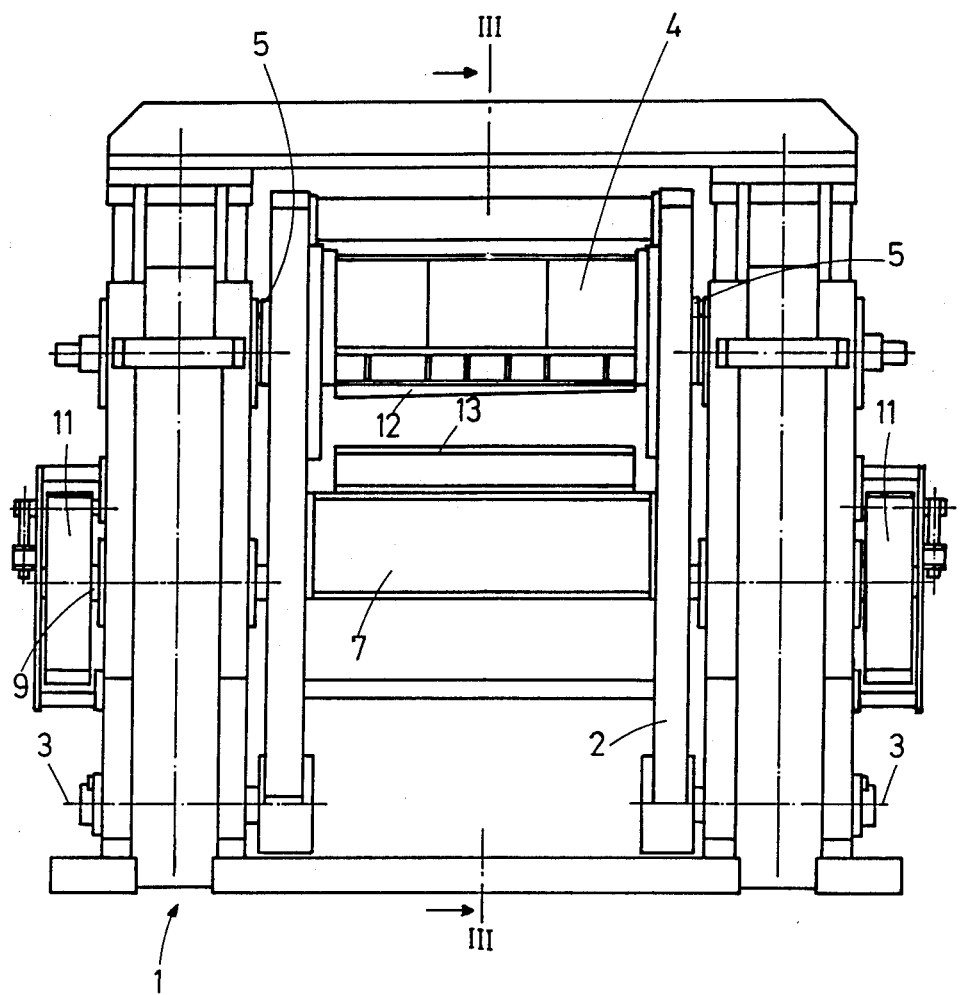
FIG. 1 shows an end view of the preferred embodiment.
Figure 2:
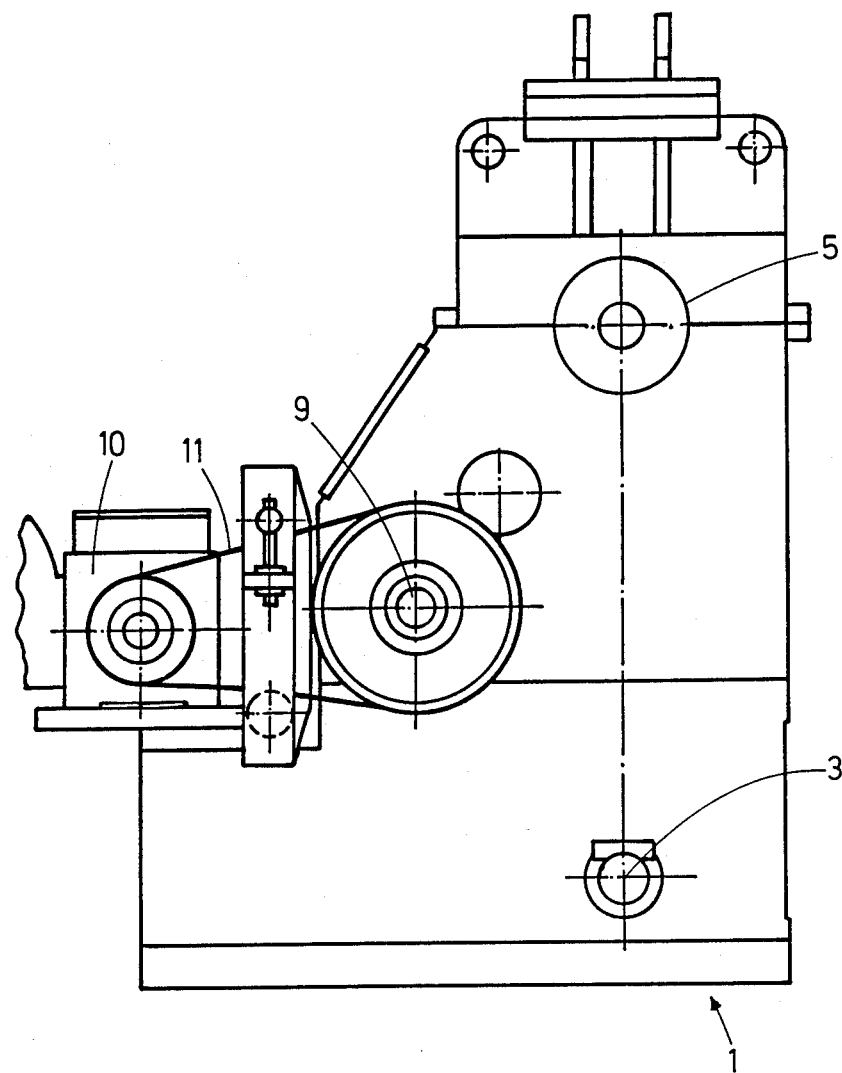
FIG. 2 shows a lateral view in the direction of arrow II in FIG. 1.
Figure 3:
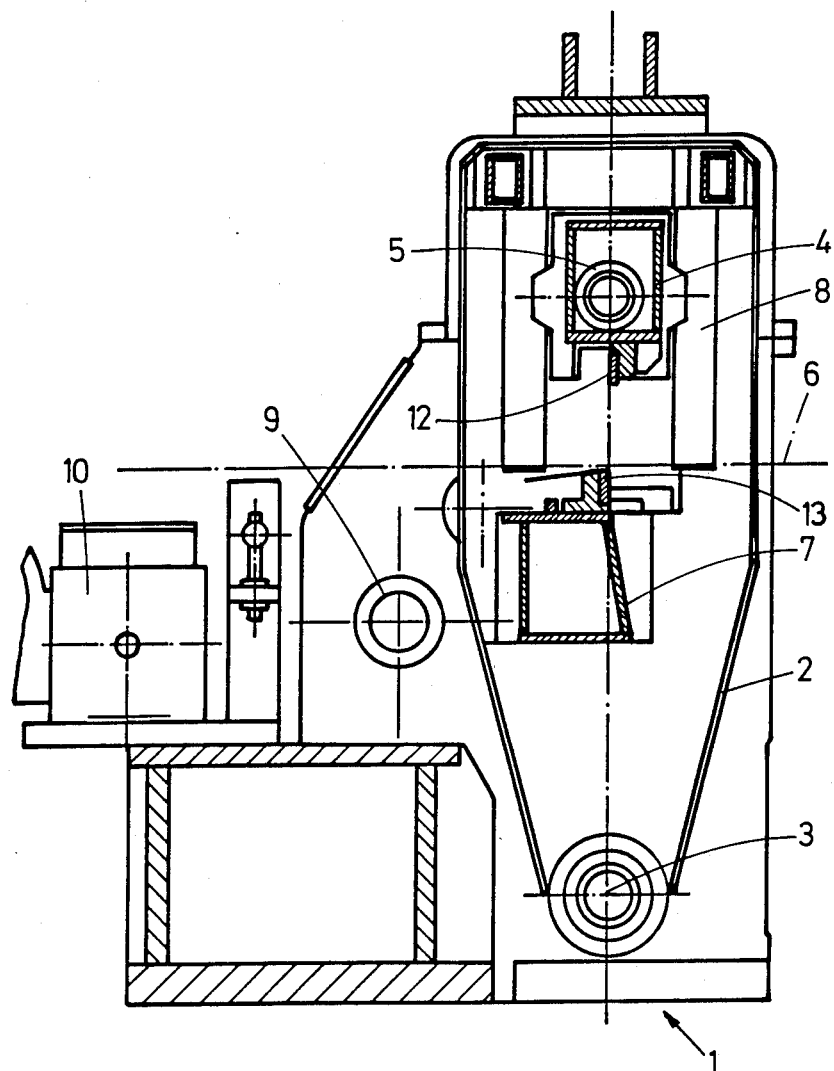
FIG. 3 shows a section along line III—III in FIG. 1.
Figure 4:
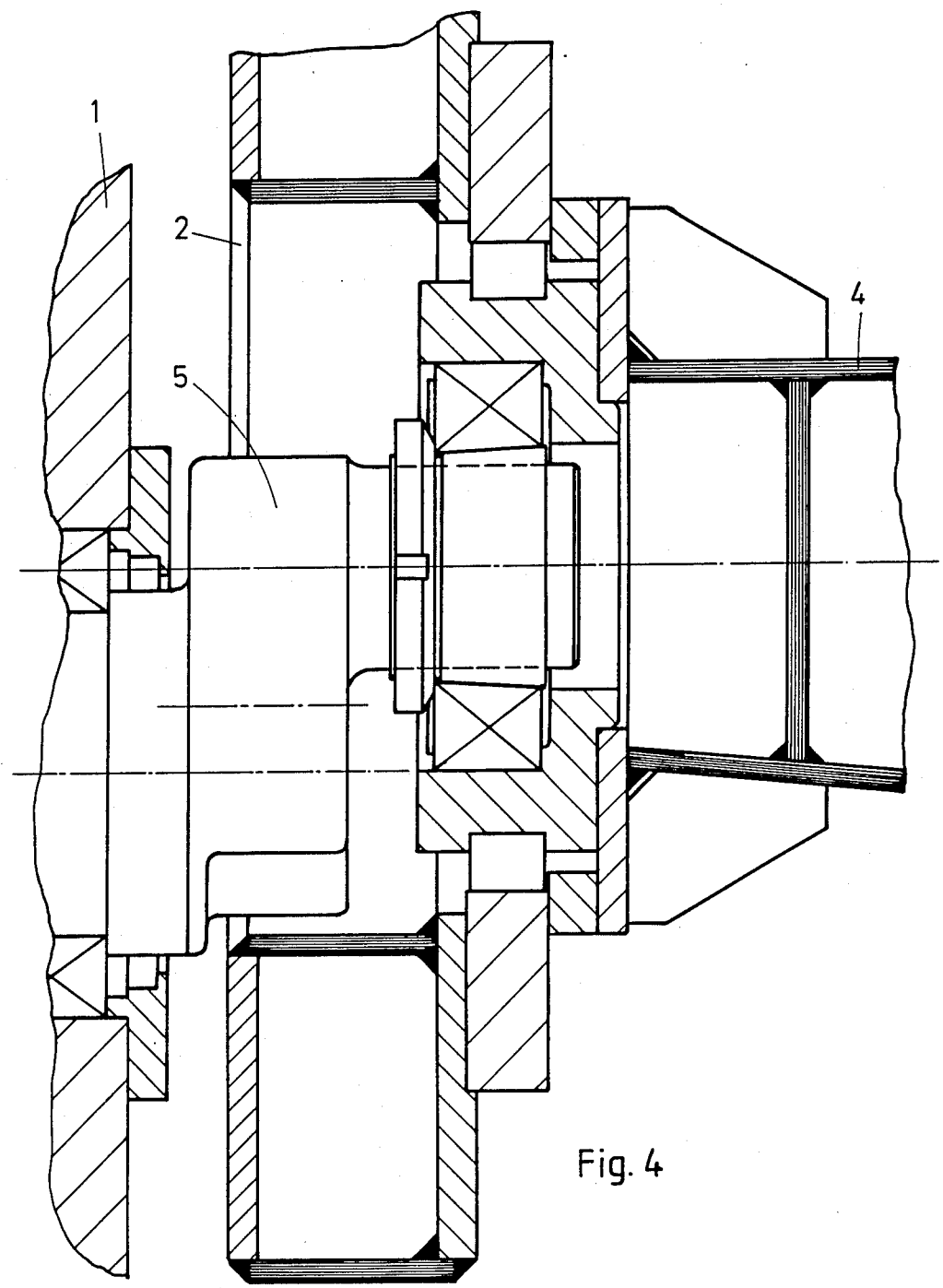
FIG. 4 shows an enlarged section in the zone of an eccentric.

In the embodiment of FIGS. 1 through 4, an oscillating yoke (2) is supported in a gate-like machine frame (1) to be pivotable about a horizontal axis (3) in the lower portion of the machine frame (1). A cutter or tool bar (4) is guided to be displaceable upwards and downwards in the oscillating yoke (2) at the top. The cutter bar (4) is connected on both sides, respectively, with one eccentric (5). A bottom cutter or tool bar (7) is fixedly mounted in the oscillating yoke (2) underneath the strip material (6) to be cut (see FIG. 3). The guide means (8) for the top cutter bar (4) can be noticed especially in FIG. 3.

A gear mechanism, not illustrated in detail, is provided on each side of the machine frame (1) for driving the synchronously running eccentrics (5). The bilateral gear systems are connected with each other by way of a rigid shaft (9). This rigid shaft (9) is driven by a DC motor or by two DC motors (10) via one or, respectively, two gear belts (11).

The DC motors (10) are actuated electronically, namely in such a way that the eccentrics (5) move the oscillating yoke (2) during the cutting step at a speed corresponding to the feeding speed of the strip material (6) in the direction of the strip material and also move a top blade (12) attached to the top cutter bar (4) in the direction toward a bottom blade (13) arranged at the bottom cutter bar (7) in such a way that the exact cutting site is hit, as will be explained below with reference to FIG. 5.

Figure 5:
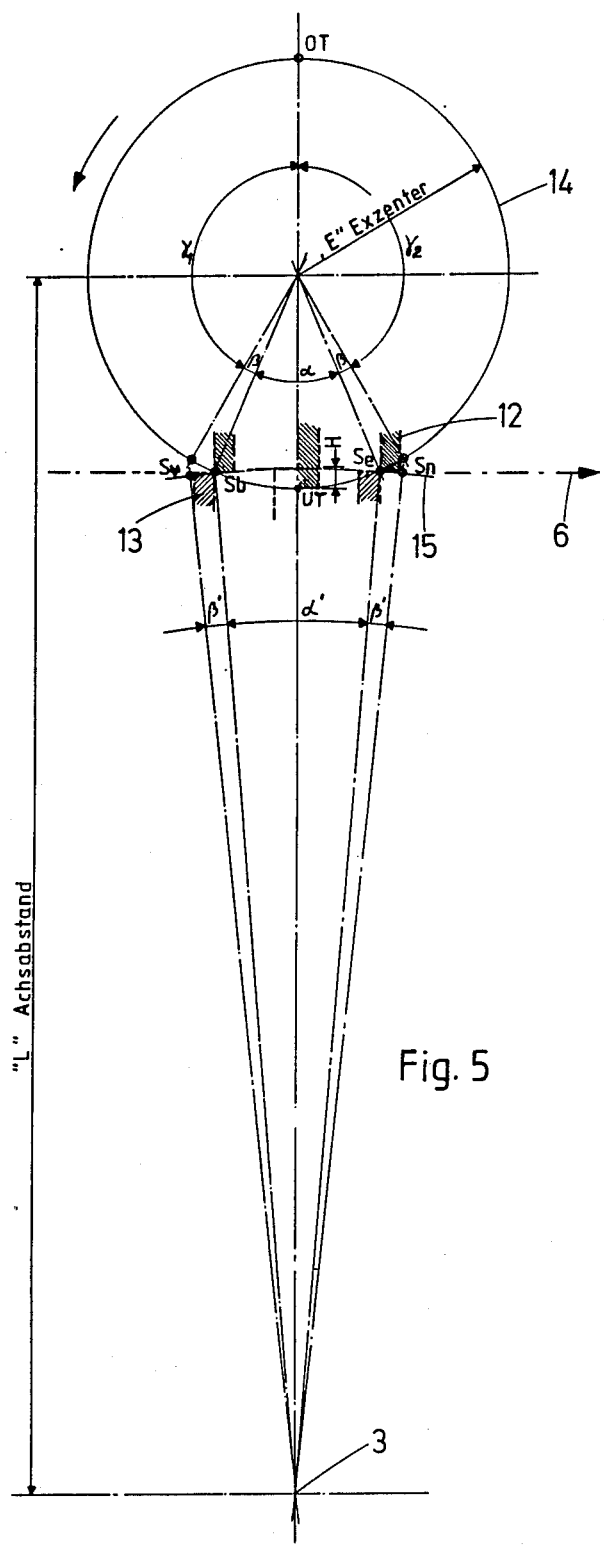
FIG. 5 shows a motion schematic of the preferred embodiment of FIGS. 1-4.

FIG. 5 shows schematically the progress of motion of the top and bottom blades (12, 13) with reference to the respective cutting edge of these blades (12, 13), which can also be stamping tools or forming cutting tools. The cutting edge of the top blade (12) moves along a circle (14) on account of the eccentrics (5). During this operation, the bottom blade (13) swings along a short arc section (15) about the pivoting axis (3) of the oscillating yoke (2).

Figure 6:
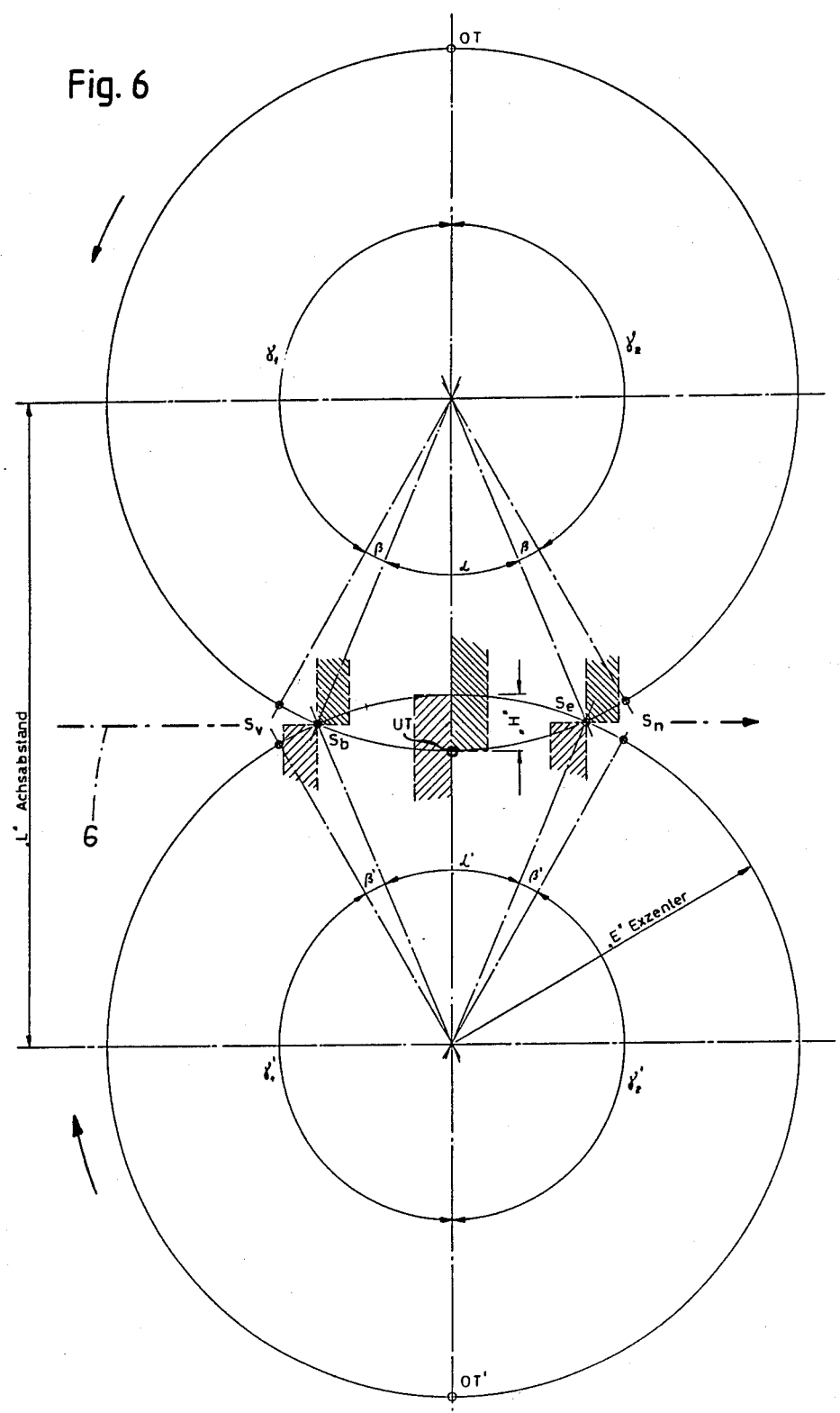
FIG. 6 shows a motion schematic of an alternative embodiment with two pairs of eccentrics.

The symbols indicated in FIG. 5 have the following meanings:

OT = top dead center (shear is opened)
UT = bottom dead center (cut has been executed)
L = axial distance between eccentric shaft and pivoting axis
H = maximum blade overlap
Sv = leading shear stroke terminated, i.e. speed and cutting site are synchronized
$\gamma_1$ = leading angle
Sb = start of cutting step, i.e. blades penetrate strip material
$\beta$ = safety angle
Se = end of cutting step, i.e. blades become disengaged again
Sn = trailing shear stroke, i.e. shear is again free for speed and strip length control
$\gamma_2$ = trailing angle The same designations apply also to the motion schematic of the alternative embodiment according to FIG. 6 wherein eccentrics are provided at the top as well as at the bottom, these eccentrics moving the blades of the shear during the cutting step toward each other and in the direction of the strip material at the speed of the latter. In this connection, L is the axial distance between the drive shafts of the top and bottom pairs of eccentrics.

I claim:

1. Apparatus for cutting a moving strip (6) of material, comprising
   (a) a frame (1);
   (b) an oscillating yoke (2) connected with said frame for pivotal movement about a horizontal axis (3) which is arranged below the strip and which extends perpendicular to the direction of movement of the strip;
(c) a bottom cutting assembly (7) connected with said yoke;
(d) a top cutting assembly (4) guided by said yoke and being vertically displaced relative to said bottom cutting assembly to cut the moving strip transported between said top and bottom cutting assemblies;
(e) a first rotatable eccentric device (5) connected with said yoke and with said top cutting assembly for simultaneously oscillating said yoke and for displacing said top cutting assembly; and
(f) controlled drive means (10) connected with said first eccentric device for rotating said eccentric device at a given speed in accordance with the speed of movement of the strip, whereby the oscillation of said yoke and the displacement of said top cutting assembly are coordinated to control the length of successive pieces of strip material cut from the strip by said top and bottom cutting assemblies.

2. Apparatus as defined in claim 1, and further comprising a rigid gear shaft (9) extending transversely across the width of said frame for connecting said drive means with said first eccentric device.

3. Apparatus as defined in claim 2, and further comprising a second rotatable eccentric device connected with said bottom cutting assembly and with said drive means for vertically displacing said bottom cutting assembly, said first and second eccentric devices being synchronously rotated in opposite directions by said drive means to displace said top and bottom cutting assemblies toward each other to perform a cutting stroke in accordance with the speed of travel of the strip.

* * * * *